United States Patent [19]

Colautti

[11] 4,005,857

[45] Feb. 1, 1977

[54] MEANS FOR WITHDRAWING SPONGE IRON FROM RETORTS

[75] Inventor: Franco Colautti, Ragosa di Povoletto (UD), Italy

[73] Assignee: Kinglor Metor S.p.A., Buttrio (UD), Italy

[22] Filed: Apr. 26, 1976

[21] Appl. No.: 680,440

[30] Foreign Application Priority Data

Apr. 28, 1975 Italy .................................. 83366/75

[52] U.S. Cl. .................................. 266/191; 266/195
[51] Int. Cl.² .......................................... F27B 1/20
[58] Field of Search ........... 214/18 R, 21; 266/176, 266/177, 191, 195; 432/239

[56] References Cited

UNITED STATES PATENTS

| | | | |
|---|---|---|---|
| 799,001 | 9/1905 | Grondal | 266/191 |
| 1,214,844 | 2/1917 | Tracy | 266/177 |

*Primary Examiner*—Gerald A. Dost
*Attorney, Agent, or Firm*—A. W. Breiner

[57] ABSTRACT

Means for withdrawing sponge iron from externally heated retorts whereby the sponge iron is withdrawn at the bottom of the retort including staggered inlet and outlet means and a minimum of three worm screw means moving at the same speed but in differing directions moving the sponge iron from the inlet to outlet means. The withdrawal means provides uniform descent of the sponge iron within the retort.

7 Claims, 5 Drawing Figures

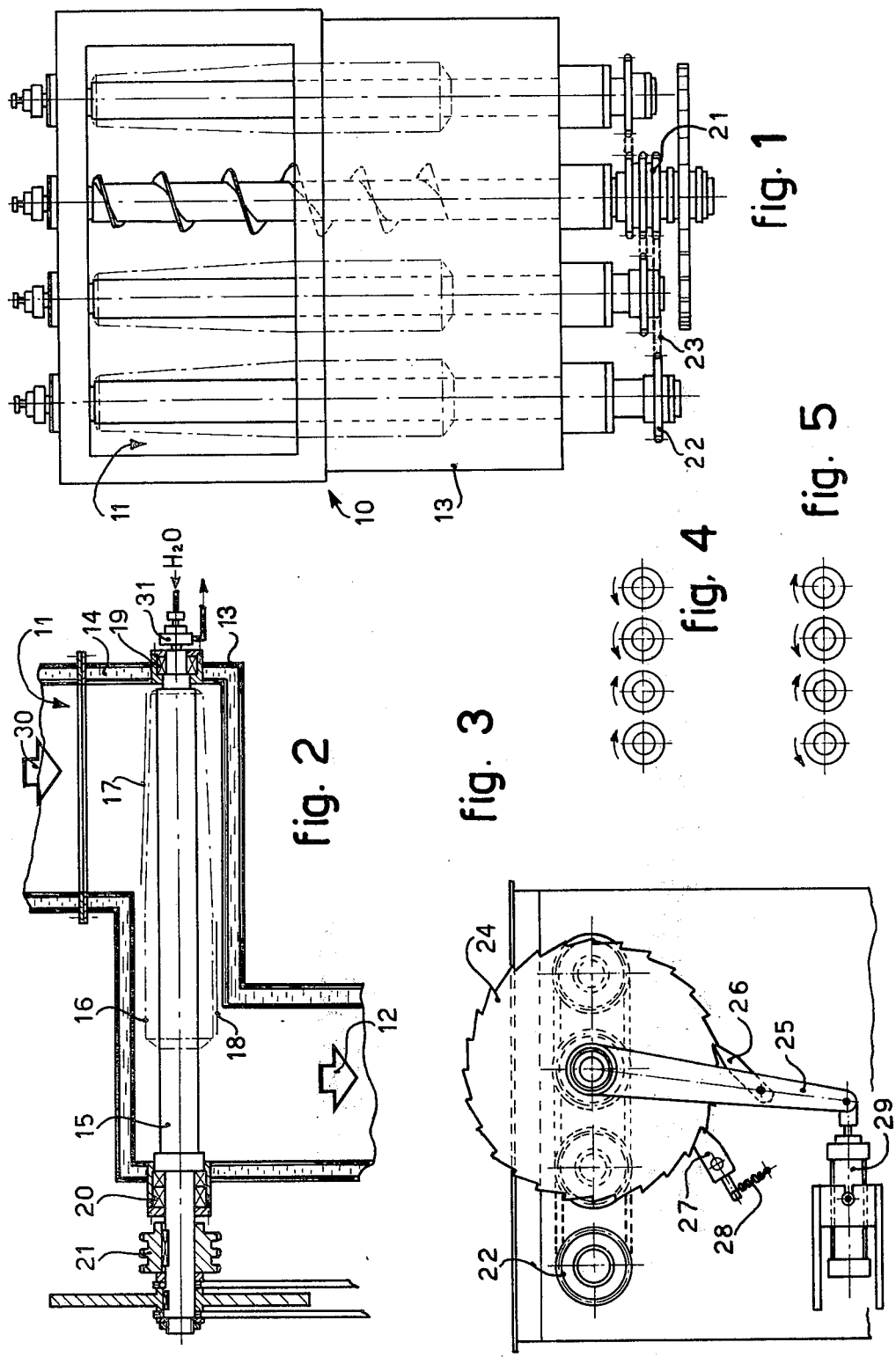

MEANS FOR WITHDRAWING SPONGE IRON FROM RETORTS

The present invention relates to means for and to a method of withdrawing sponge iron from retorts which carry out the carbothermic process of reduction of iron ore through external heating of the retort itself.

In retorts in which the carbothermic reduction process is carried out there is the difficult problem of obtaining a constant speed of descent at any horizontal section, and at every position of that horizontal section. This leveling of the speed of descent is necessary, however, to prevent the ore from being held in the retort for a longer or shorter period of time than is required. In either case, there are many serious consequences.

The present invention, therefore, is to realize the withdrawal of sponge iron, together with the natural substances included therewith, from the bottom of a retort in such a way that the speed of descent, when measured at any chosen height and along the whole of the horizontal area belonging to said height, is equal or substantially equal at any point in said area.

In accordance with invention, the aforesaid result is accomplished by means of a plurality of worm screw means which are positioned side by side and at right angles to the axis of the retort and which move the sponge iron laterally in respect to the retort in the direction of the axis of the worm screw means. In accordance with a specific preferred embodiment, each worm screw means is tapered, the broadest part of which lies in the direction of the outlet. Moreover, according to a preferred embodiment of the invention, a minimum of three worm screw means are provided over a width of a retort equal to about six times the maximum diameter of each worm screw means. This ratio between the width of the retort and the maximum diameter of a worm screw means may vary from 1 : 4.5 to 1 : 7. Furthermore, the worm screw means rotate at the same speed but with their own individual directions of rotation.

Therefore, in accordance with the invention, the means for withdrawing sponge iron from retorts which are heated externally and which carry out the carbothermic process of reduction of iron ore, whereby the sponge iron is withdrawn at the bottom by lateral displacement, is characterized by the fact that the withdrawal means has a minimum of three worm screw means which work at the same speed but in differing directions and which are substantially conical and lie below the outlet of the retort. The ratio between the maximum diameter of a worm screw means and the width of the retort may be from 1 : 7 to 1 : 4.5 and is advantageously about 1 : 6.

A preferential lay-out of the invention will be apparent from the drawing which is given for non-limitative, exemplificative purposes.

In the drawing,

FIG. 1 shows the withdrawal means from above;

FIG. 2 is a side view of the withdrawal means of FIG. 1 in accordance with a vertical section along the motive worm screw means;

FIG. 3 shows a preferential drive system; and

FIGS. 4 and 5 show possible directions of rotation for the arrangement of the withdrawal means of FIG. 1.

More specifically, referring to the drawing as a whole, 10 is generically the withdrawal means. 11 is the inlet and 12 is the outlet. 13 is the container having an interspace 14 for circulation of cooling water. 15 is the shaft carrying the worm screw means. 17 is the topmost part of the worm screw means positioned substantially below the inlet 11, while 18 is the lower-most part of the worm screw means positioned between the inlet 11 and the outlet 12 and partially positioned above the latter. 19 is the rear support, while 20 is the front support. 21 is the drive gear wheel for transmitting motion to the driven gear wheels 22 by means of chains 23. 24 is a ratchet-wheel integral with an axle 15. 25 is the swiveling crank carrying the pawl 26, which is flexibly pressed against the ratchet-wheel 24. 27 is the fixed non-return pawl, which is flexibly pressed by means of the spring 28. 29 is the thrust group and, as shown, consists of a cylinder which may operte hydraulically or with compressed air. 31 is the injector which receives the cooling water and causes it to enter the shaft 15, thus cooling the latter throughout its entire length.

The sector of the worm screw means 17 positioned below the outlet of the retort may present a constant variation in breadth or may follow a curvilinear law. The motor system may also be replaced with independent motor groups or with a continuous-motion motor group.

In operation, the mass of sponge iron presses from above in the direction of the arrow 30, and the worm screw means with their differing directions of rotation cause a substantially constant descent of the material lying above along the whole of the space 11. The material is caught by the worm screw means and is not only transferred but is also crumbled. When it arrives at the outlet 12, the material falls into the storage point below. The staggering of the positions of the inlet 11 and the outlet 12 prevents the material from falling owing to its own motion. If a still more uniform withdrawal is desired, it will be sufficient to reduce the ratio between the maximum diameter of the worm screw means and the width of the space therefor and to place more worm screw means therein.

The above describes a preferential embodiment of the invention. However, obvious variants are possible. It is possible to vary the ratios and sizes of the worm screw means. It is possible to vary the drive system for the screw means. It is also possible to provide for two or more withdrawal groups side by side for a single retort. It is possible to circulate water, or not, through the shafts 15. These and other variants will be apparent to one skilled in the art without departing from the scope of the inventive concept disclosed.

It is claimed:

1. Means for withdrawing sponge iron from retorts containing ore, which are heated externally, comprising in reciprocal coordination and cooperation a housing having an inlet placed below the outlet of a retort and having an outlet in staggered relation with respect to the position of said inlet and following thereafter, at least three worm screw means within said housing, cooled internally, having a first tapered sector positioned below said inlet; and having a second substantially circular sector extending above said outlet, there being between the length of the inlet and the diameter of each worm screw means a ratio of from about 1 : 4.5 and 1 : 7.

2. Means for withdrawing sponge iron from retorts containing ore according to claim 1 wherein said first tapered sector of the worm screw means has a substantially linear progression.

3. Means for withdrawing sponge iron from retort containing ore according to claim 1 wherein said first tapered sector of the worm screw means has a curvilinear progression.

4. Means for withdrawing sponge iron from retorts containing ore according to claim 1 wherein the axle of the worm screw means is cooled internally by injection of water.

5. Means for withdrawing sponge iron from retorts containing ore according to claim 1 including means whereby the movement of the worm screw means is a combined movement of phase coincidence and phase difference.

6. Means for withdrawing sponge iron from retorts containing ore according to claim 1 wherein said housing includes an interspace for circulation of water.

7. Means for withdrawing sponge iron from retorts containing ore according to claim 1 wherein said ratio between the length of the inlet and diameter of each worm screw means is 1 : 6.

* * * * *